United States Patent
Tiotantra et al.

(10) Patent No.: US 10,402,094 B2
(45) Date of Patent: Sep. 3, 2019

(54) MAPPING SYSTEM FOR DATA STORAGE DEVICES

(71) Applicant: Seagate Technology LLC, Cupertino, CA (US)

(72) Inventors: Harry Tiotantra, Singapore (SG); Chen Kai, Singapore (SG); Xie WenXiang, Singapore (SG); Shen Feng, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/785,721

(22) Filed: Oct. 17, 2017

(65) Prior Publication Data

US 2019/0114083 A1     Apr. 18, 2019

(51) Int. Cl.
G06F 3/06 (2006.01)

(52) U.S. Cl.
CPC .......... G06F 3/0607 (2013.01); G06F 3/067 (2013.01); G06F 3/0644 (2013.01); G06F 3/0665 (2013.01); G06F 3/0689 (2013.01)

(58) Field of Classification Search
USPC ........................................................ 711/114
See application file for complete search history.

(56) References Cited

U.S. PATENT DOCUMENTS

| | | | |
|---|---|---|---|
| 8,665,545 B2 | 3/2014 | Coker et al. | |
| 8,687,303 B2 | 4/2014 | Hall | |
| 8,896,953 B2 | 11/2014 | Haga et al. | |
| 8,947,815 B2 | 2/2015 | Aoki | |
| 8,947,817 B1 | 2/2015 | Chung et al. | |
| 9,305,041 B2 * | 4/2016 | Demidov | G06F 16/2365 |
| 2002/0107893 A1 * | 8/2002 | Ohkouchi | G06F 16/9027 715/276 |
| 2012/0119927 A1 * | 5/2012 | Zhang | H03M 7/3066 341/79 |
| 2013/0007658 A1 * | 1/2013 | Loughlin | G06F 3/0483 715/810 |

(Continued)

OTHER PUBLICATIONS

Chin-Hsien Wu et al., "An Efficient B-Tree Layer for Flash-Memory Storage Systems", Jul. 1, 2007, ACM Transactions on Embedded Computing Systems. pp. 1-16. (Year: 2007).*

*Primary Examiner* — Charles Rones
*Assistant Examiner* — Jonah C Krieger
(74) *Attorney, Agent, or Firm* — Westman, Champlin & Koehler, P.A.

(57) ABSTRACT

A method includes generating a map for a storage tier. The map maps a plurality of extents to physical locations on the storage tier and is implemented as a tree with each extent to physical location mapping being one of a plurality of leaf extent nodes of the tree. Individual ones of the plurality of leaf extent nodes are compressed into small extent nodes. Different groups of the small extent nodes are associated with carrier nodes. A command that involves an extent of the plurality of extents, which is represented by a small extent node in one of the carrier nodes, is received from a host. A decompression operation is performed on the small extent node in the carrier node to provide a leaf extent node for the extent associated with the host command. An extent node operation is performed on the leaf extent node for the extent.

20 Claims, 8 Drawing Sheets

(56) References Cited

U.S. PATENT DOCUMENTS

| | | | |
|---|---|---|---|
| 2014/0258648 A1* | 9/2014 | Yadav | G06F 3/0619 |
| | | | 711/155 |
| 2016/0019156 A1 | 1/2016 | Feldman et al. | |
| 2016/0098352 A1 | 4/2016 | Tan et al. | |
| 2016/0321174 A1 | 11/2016 | Li et al. | |
| 2017/0031614 A1* | 2/2017 | Katiyar | G06F 3/0665 |
| 2017/0083246 A1 | 3/2017 | Liu et al. | |
| 2018/0046690 A1* | 2/2018 | Keahey | G06F 16/26 |

* cited by examiner

MAPPING SYSTEM FOR DATA STORAGE DEVICES

BACKGROUND

Data storage devices are used to access digital data in a fast and efficient manner. In such devices, data are often structured in terms of variable length files or extents, which can be constituted from one or more fixed-sized logical blocks (such as logical blocks which are addressed using logical block addresses (LBAs)).

To store or retrieve user data with an associated data storage device, host commands are generally issued to the device using a logical block convention. The device links LBAs associated with host write commands to physical locations or blocks of media on which the data are to be stored. The device may also utilize logical to physical translation methods (e.g., mapping systems) to locate logical blocks in an optimal physical location from which the data are to be retrieved.

SUMMARY

In one embodiment, a method is provided. The method includes generating a map for a storage tier of a data storage device. The map maps a plurality of extents to physical locations on the storage tier. The map is implemented as a tree with each extent to physical location mapping being one of a plurality of leaf extent nodes of the tree. Individual ones of the plurality of leaf extent nodes are compressed into small extent nodes. Different groups of the small extent nodes are associated with carrier nodes such that each of the carrier nodes has multiple associated small extent nodes. The method further includes receiving a command from a host that involves an extent of the plurality of extents, the extent being represented by a small extent node in one of the carrier nodes. Upon receiving the command, a decompression operation is carried out on the small extent node in the one of the carrier nodes to provide a leaf extent node for the extent associated with the host command. An extent node operation is performed on the leaf extent node for the extent.

In another embodiment, an apparatus is provided. The apparatus includes an extent mapping module configured to generate a plurality of extent mapping elements, with each extent mapping element mapping one of a plurality of extents to one or more physical locations on a storage tier, and each extent mapping element having a characteristic that enables the extent mapping module to recognize the extent mapping element. The apparatus also includes a map compression module configured to compress individual ones of the plurality of extent mapping elements into small extent mapping units, with each small extent mapping unit being without the characteristic that enables recognition by the extent mapping module. The map compression module is further configured to associate different groups of the small extent mapping units with carrier elements such that each of the carrier elements has multiple associated small extent mapping units, and each of the carrier elements has the characteristic that enables recognition by the extent mapping module.

In yet another embodiment, a data storage device is provided. The data storage device includes a storage tier and control circuitry. The control circuitry is configured to generate a map for the storage tier. The map maps a plurality of extents to physical locations on the storage tier. The map is implemented as a tree with each extent to physical location mapping being one of a plurality of leaf extent nodes of the tree. The control circuitry is further configured to compress individual ones of the plurality of leaf extent nodes of the tree into small extent nodes, and to associate different groups of the small extent nodes with carrier nodes such that each of the carrier nodes has multiple associated small extent nodes. The control circuitry receives a command from a host that involves an extent of the plurality of extents. The extent is represented by a small extent node in one of the carrier nodes. The control circuitry performs a decompression operation on the small extent node in the one of the carrier nodes to provide a leaf extent node for the extent associated with the host command. The control circuitry then performs an extent node operation on the leaf extent node for the extent.

This summary is not intended to describe each disclosed embodiment or every implementation of the mapping system for data storage device described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to mapping systems, which map logical and physical addresses, for data storage management in data storage or memory devices. A map may be used to find physical addresses of data in a data storage device based on a logical address used by a host device. On data storage systems with very large memory capacity, such a map may be represented with a data structure, e.g., a tree, index file, hash table, etc., that may provide an updateable and searchable representation of the map. Data structures with these capabilities carry a memory footprint cost, depending on their size, and may not be able to grow large enough to maintain a map to within the constraints of the available memory on a data storage device. More memory to store a data structure representing the map may be used where the data storage media have a large range of physical addresses and/or where the fragmentation levels are expected to be large. For devices to increase the size of a map and retain favorable searching and updating capabilities without adding memory, embodiments of the disclosure provide map compression techniques. Prior to providing additional details regarding the map compression techniques, a description of an illustrative operating environment is provided below.

Figure 1:
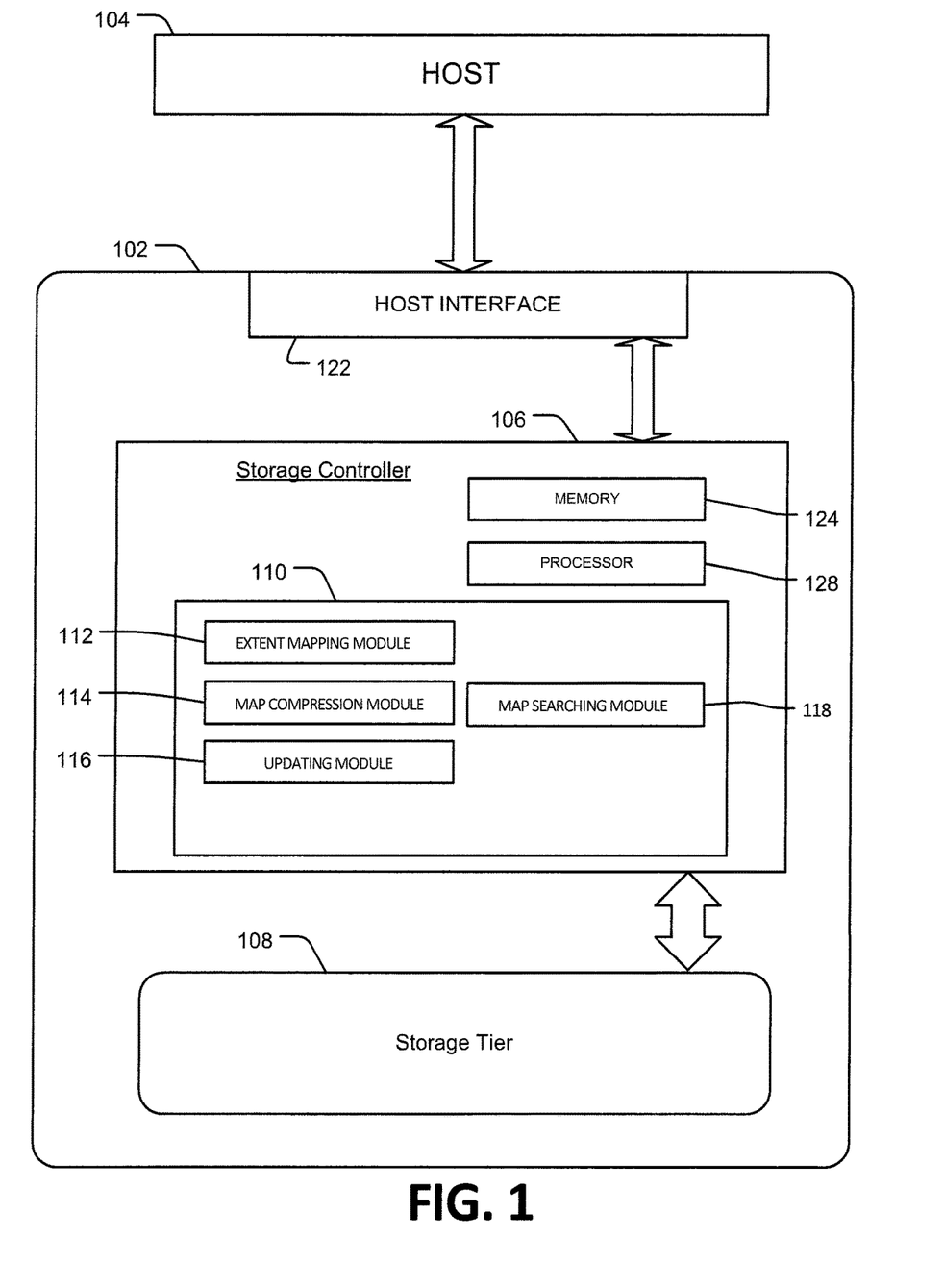
FIG. 1 is a block diagram of an example apparatus having a storage tier with an associated map that is compressed in accordance with one embodiment.

FIG. 1 is a block diagram of an example apparatus 100 having a storage tier with an associated map. The apparatus 100 includes a data storage device 102 with a storage controller or control circuit 106 that communicatively couples a storage tier 108 to a host 104 via a host interface 122. In an implementation, the storage tier 108 is a dynamic storage tier. The storage controller 106 provides a mechanism to allow the host 104 to store data to and retrieve data from the storage tier 108. In an implementation, the storage tier 108 may include a data cache (e.g., a media cache that may occupy a portion of a data storage medium that also includes a main data store portion). In another implementation, the storage tier 108 may be a main data store. The storage tier 108 may include without limitation one or more of magnetic data storage discs, optical data storage discs, non-volatile random access memory (RAM), such as NAND flash memory and a volatile RAM storage medium such as dynamic random access memory (DRAM).

The storage controller 106 may utilize communication interfaces and protocols including SATA (serial advanced technology attachment), SCSI (small computer system interface), eSATA (external serial advanced technology attachment), SAS (serial attached SCSI), USB (universal serial bus), and others to communicate with the host 104 via the host interface 122. The storage controller 106 also includes multiple modules 110, such as an extent mapping module 112, a map compression module 114, an updating module 116, and a map searching module 118. The extent mapping module 112 generates a map relating logical addresses (e.g., logical block addresses) to physical locations. The map compression module 114 may rewrite at least a portion of the map generated by the extent mapping module 112 into a compressed format, and may decompress portions of the map that are in the compressed format to enable search and/or update operations on the map. Details regarding map compression in accordance with embodiments of the disclosure are provided further below in connection with FIGS. 2A-2C.

The map searching module 118 searches the map to locate a region of the map corresponding to a logical address. In an implementation, the searching module 118 is configured to locate a region of a compressed map corresponding to a logical block address using, for example, a tree or an index file. The map searching module 118 may perform searches on a compressed and/or uncompressed map. For example, the map searching module may accept read, write and/or erase requests from the host 104 via the host interface 122, and perform searches associated with the requested operations on a compressed and/or uncompressed map.

The updating module 116 may perform updates to any data in a map. For example, the updating module 116 may mark an entry in a map as deleted by editing the value in the physical location field to a special value that indicates the entry is deleted. The updating module 116 may further update the physical location field in a map by substituting an equal width or a narrower-width location for the value in the entry's physical location field. The updating module 116 may further make any edits to a map.

As can be seen in FIG. 1, the storage controller 106 also includes a memory 124 that may be used for storing data and/or one or more of modules 110 in some embodiments. It should be noted that, in different embodiments, different ones of modules 110 may comprise hardware, software and/or firmware. In one embodiment, the memory 124 stores a map that includes at least some portions that are compressed. The storage controller 106 further includes a processor 128. The processor 128 may perform functions of the storage controller 106 including functions disclosed herein as performed by modules 110. The processor 128 may execute instructions stored on non-transitory computer readable media to perform the functions of the storage controller 106.

It should be noted that, in some embodiments, updating module 116 may be integrated into extent mapping module 112. Further, in such embodiments, portions of map searching module 118 that search for extent mapping units that are not compressed may be integrated into extent mapping module 112. Also, in some embodiments, portions of map searching module 118 that carry out searches on compressed portions of the map may be integrated into map compression module 114. In general, different modules 110 may be configured in any suitable manner depending upon the type of application in which they are used.

Figure 2A:
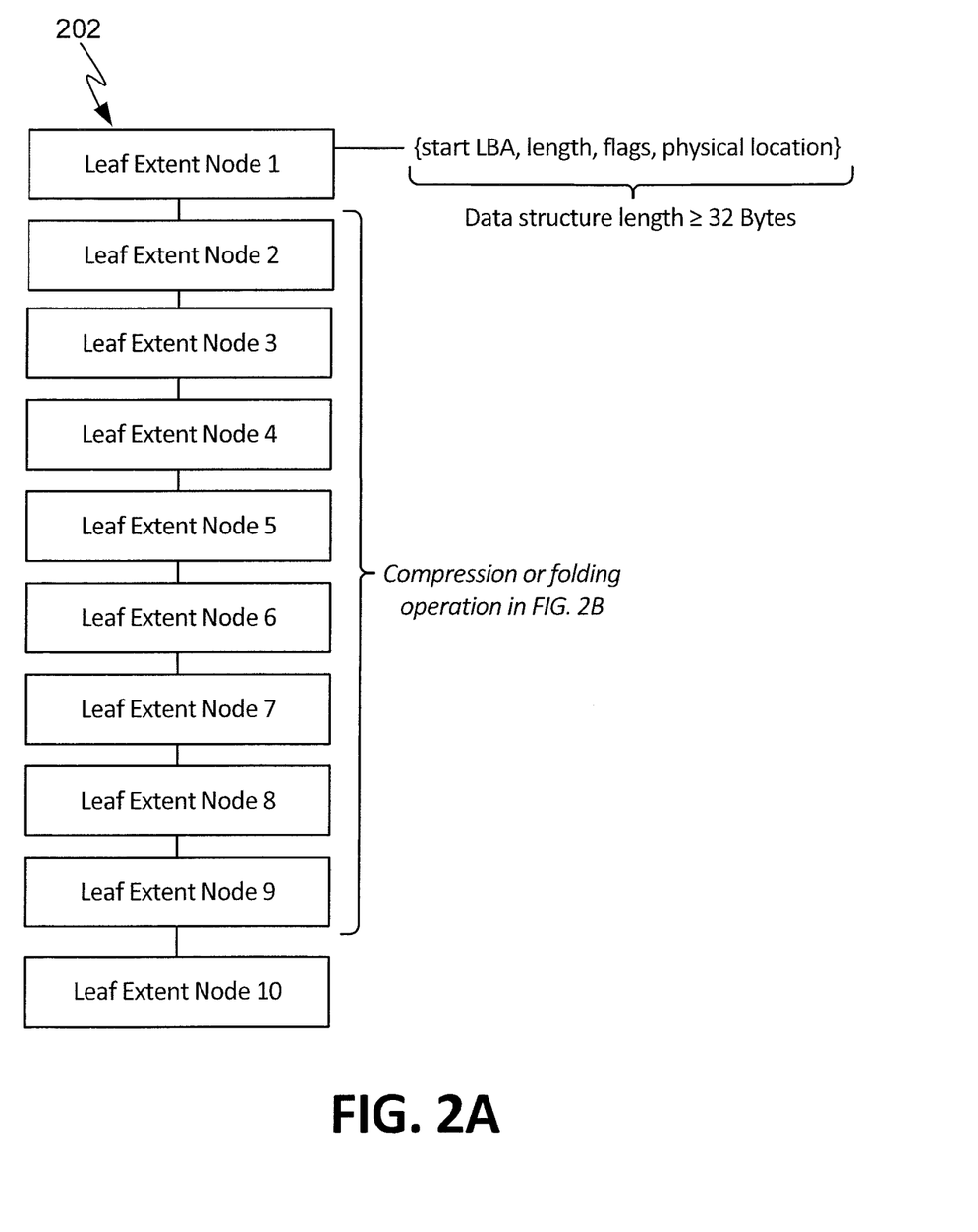
FIGS. 2A, 2B and 2C are diagrammatic illustrations that together illustrate map compression in accordance with one embodiment.
Figure 2B:
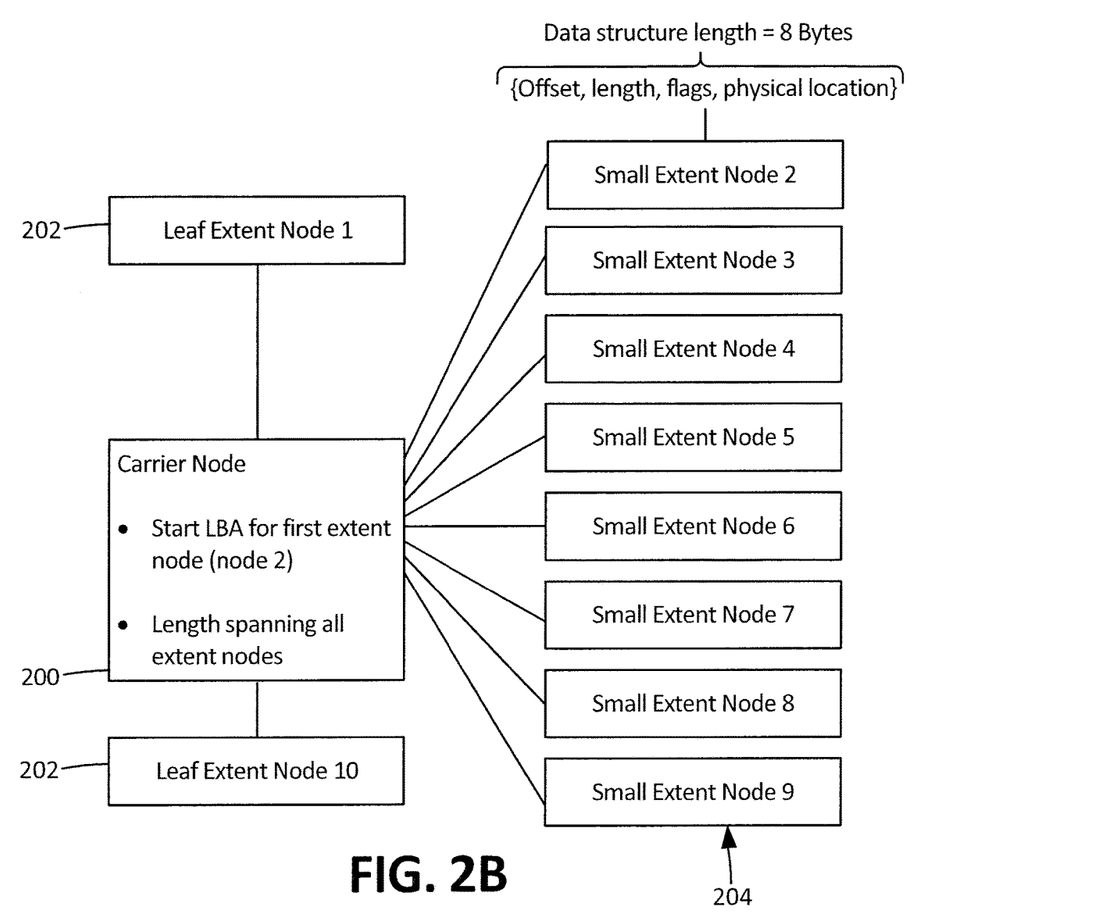
Figure 2C:
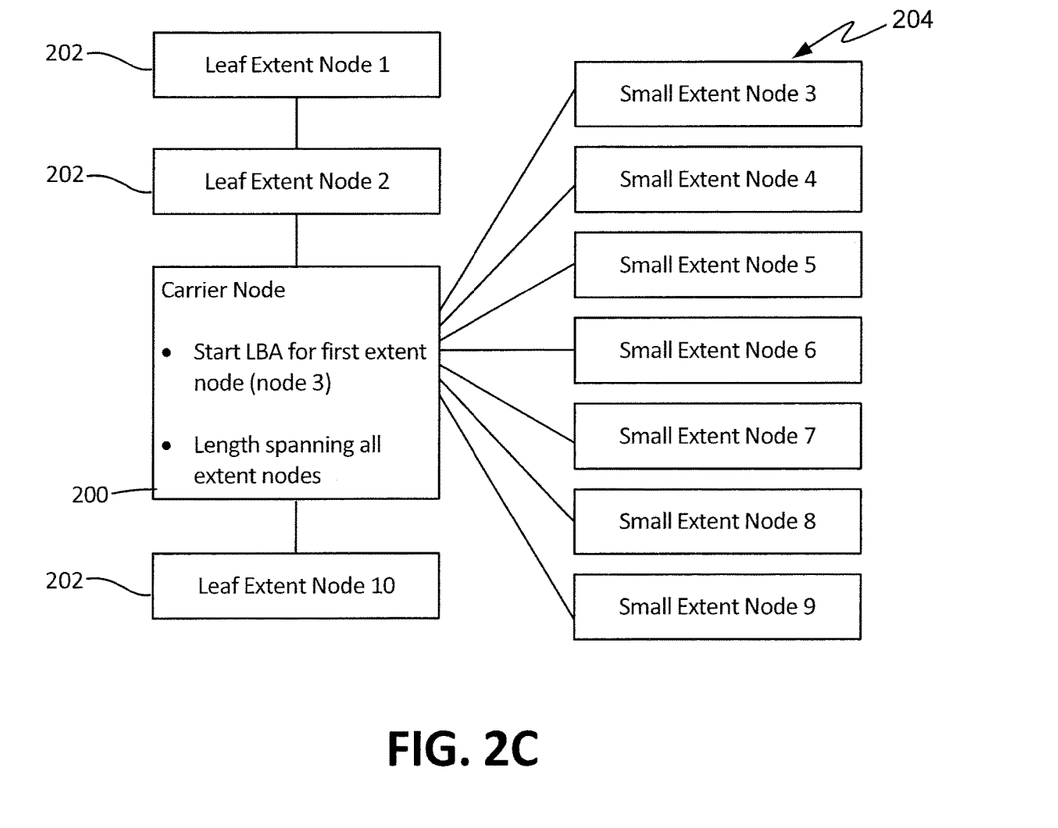

FIGS. 2A, 2B and 2C are simplified block diagrams that together illustrate a map compression technique in accordance with one embodiment. The map compression technique described below in connection with FIGS. 2A, 2B and 2C may be implemented in, for example, map compression module 114 of FIG. 1. FIGS. 2A, 2B and 2C illustrate a map portion in which extents (e.g., contiguous LBA ranges such as files sent by a host) are mapped to physical locations of a data storage medium. In the example shown in FIGS. 2A, 2B and 2C, each extent mapping element is a leaf node, which is a part of a tree (e.g., a binary plus tree (B+ tree)). In the interest of simplification, only the lowest level (e.g., the leaf level) of the tree is shown in FIGS. 2A, 2B and 2C because the map compression is carried out on the leaf nodes.

FIG. 2A illustrates an uncompressed map portion that includes extent mapping elements of ten different extents. As can be seen in FIG. 2A, the ten different extent mapping elements are leaf extent nodes 1-10. Each of leaf extent nodes 1-10 is a data structure having a predetermined minimum length (e.g., 32 bytes) and which includes a start LBA, a length (e.g., a number of LBAs in the extent), flags or status indicators for the extent, and an address of a physical location on a data storage medium on which data associated with a first LBA of the extent is stored. As can be seen in FIG. 2A, the leaf extent nodes 1-10 are linked together in a chain (e.g., in a linked list).

In embodiments of the disclosure, map compression is carried out by compressing individual leaf extent nodes into small extent nodes. Different groups of small extent nodes are associated with carrier nodes such that each of the carrier nodes has multiple small extent nodes. In the example shown in FIGS. 2A, 2B and 2C, leaf extent nodes 2-9 of FIG. 2A are compressed into small extent nodes 2-9, and the small extent nodes 2-9 are associated with a carrier node 200 as shown in FIG. 2B. The leaf extent nodes are denoted by reference numeral 202 and small extent nodes are denoted by reference numeral 204. The carrier node 200 has a data structure that includes a start LBA for a first small extent node (e.g., small extent node 2) and a length spanning all small extent nodes (e.g., small extent nodes 2-9) associated with the carrier node 200. The carrier node 200 data structure has a predetermined minimum length (e.g., 32 bytes) which corresponds to a minimum length of a leaf extent node (e.g., any of leaf extent nodes 1-10). Thus, when carried node 200 is included in a chain that has leaf extent nodes such as leaf extent node 1 and leaf extent node 10 shown in FIG. 2B, an extent mapping module (such as 112 of FIG. 1) treats carrier node 200 in a similar manner as a leaf extent node, for example, when carrying out a search operation within the chain. Thus, the extent mapping module may traverse the chain to locate a start LBA in carrier node 200 in a similar manner as a start LBA of a leaf extent node. Therefore, to the extent mapping module, carrier node 200 is indistinguishable from a leaf extent node.

Each of small extent nodes 2-9 is a data structure having a predetermined length (e.g., 8 bytes) and which includes an offset from the start LBA stored in the carrier node 200, a length (e.g., a number of LBAs in the extent), flags or status indicators for the extent, and an address of a physical location on a data storage medium on which data associated with a first LBA of the extent is stored. A reduction in length of the small extent node is achieved by replacing the start LBA of the leaf node with the offset, which may have a length that is substantially smaller than a length of the LBA. However, the reduction in length and the replacement of the start LBA with the offset may render the small extent node unsuitable for extent node operations by the extent mapping module. Accordingly, a decompression operation may be carried out on a small extent node prior to an extent node operation being carried out on that node. A decompression operation on a small extent node is described below in connection with FIG. 2C.

A host command that involves an extent may be received in the data storage device. The extent may be represented by a small extent node (e.g., small extent node 2) in the carrier node 200. As indicated above, small extent node 2 may not be suitable for extent node operations by the extent mapping module. Therefore, small extent node 2 is unlinked and decompressed or unfolded from carrier node 200 to reconstitute leaf extent node 2. The decompression or unfolding operation includes replacing the offset in the small extent node 2 data structure with a start LBA address for leaf extent node 2. Since, prior to decompression, small extent node 2 was the first small extent in the carrier node 200, the start LBA of leaf extent node 2 is directly obtained from the carrier node 200. However, decompression or unfolding of other small extent nodes (e.g., small extent nodes 3-9) would involve calculating the start LBA corresponding to that small extent node by adding the offset value in the small extent node to the start LBA of the first small extent node (e.g., small extent node 2) in the carrier node 200. In the example of FIG. 2C, after small extent node 2 is decompressed or unfolded to reconstitute leaf extent node 2, leaf extent node 2 is linked to the chain as shown in FIG. 2C. Once leaf extent node 2 is within the chain, the extent mapping module can proceed with executing extent node operations in accordance with the host command.

In general, each extent mapping element (e.g., each leaf extent node) has a characteristic (e.g., a minimum predetermined length) that is recognized by the extent mapping module. However, each small extent mapping unit is without the characteristic that enables recognition by the extent mapping module. Therefore, the small extent mapping units are associated with carrier elements (e.g., carrier nodes) such that each of the carrier elements has multiple associated small extent mapping units, and such that each of the carrier elements has the characteristic that enables recognition by the extent mapping component. This allows for linking of, for example, leaf extent nodes and carrier nodes in a same chain in which operations by the extent mapping module are carried out.

Figure 3:
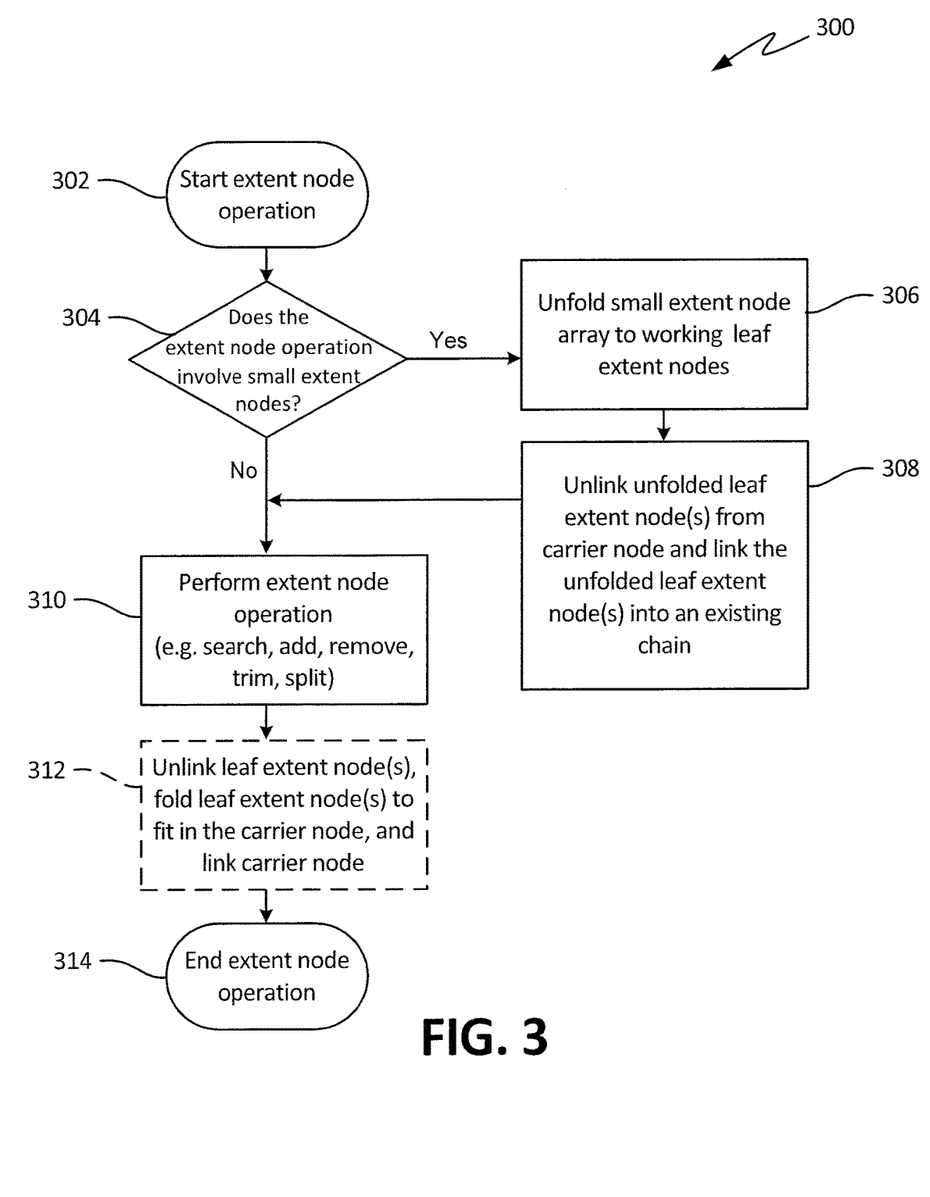
FIG. 3 is a flow diagram of a method including map compression in accordance with one embodiment.

FIG. 3 is a flowchart 300 of a method embodiment that employs carrier nodes and small extent nodes of the type described above in connection with FIGS. 2B and 2C. The method starts at step 302 at which an extent node operation is identified. At step 304, a determination is made as to whether the extent node operation involves small extent nodes (e.g., an array of small extents nodes associated with a carrier node). If small extent nodes are involved, at step 306, one or more of the small extent nodes associated with the carrier code are decompressed or unfolded into working leaf extent nodes. At step 308, the unfolded leaf extent nodes are unlinked from the carrier node, and then linked into an existing chain of the type described above in connection with FIGS. 2A, 2B and 2C. Control then passes to step 310. Also, if a determination is made at step 304 that small extent nodes are not involved in the extent node operation, control passes to step 310. At step 310, the extent node operation is carried out on one or more leaf extent nodes in the chain. The extent node operation may involve search, add, remove, trim, split and/or any other map-related operations. Once the extent node operations are completed, at step 312, the leaf extent nodes that were decompressed or unfolded at step 306 and/or any other leaf extent nodes may be compressed or folded in a manner described above in connection with FIG. 2A. It should be noted that step 312 is optional and may be used when compression of leaf extent nodes is desired. The method ends at step 314.

In the embodiment described in connection with FIG. 3, steps 302, 310 and 314 may be carried out by an extent mapping module such as 112 of FIG. 1 and steps 304, 306, 308 and 312 may be carried out by a compression module such as 114 of FIG. 1. Thus, compression module 114 may act as a firmware plug-in or addition that operates in conjunction with an extent mapping module. The map compression operations carried out by compression module 114 are transparent to the extent mapping module 112.

Figure 4A:
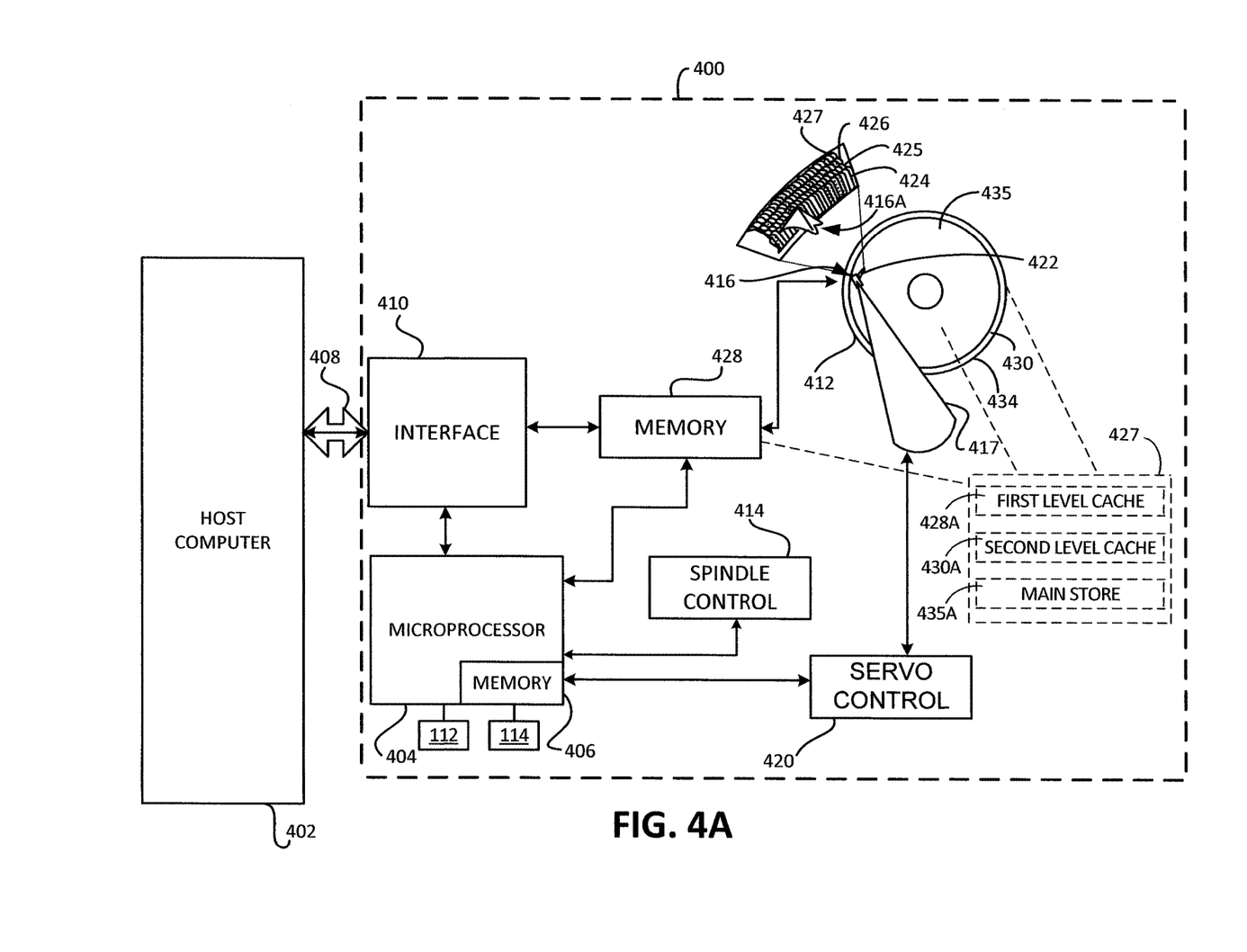
FIG. 4A is a block diagram of a data storage device that employs map compression in accordance with one embodiment.

FIG. 4A shows a block diagram of a disc drive 400 that employs map compression in accordance with one embodiment. Disc drive 400 is a particular example of a data storage or memory device 108. As will be described in detail further below, in one embodiment, disc drive 400 employs one or more discs on which multiple data tracks may be written in a partially-overlapping shingled pattern, with each successive track overwriting a portion of the previous track.

Disc drive 400 is shown in FIG. 4A to be operably connected to a host computer 402 in which disc drive 400 may be mounted. Disc drive 400 includes a microprocessor system 404 that generally provides top level communication and control for disc drive 400 in conjunction with programming for microprocessor system 404 stored in microprocessor memory 406. Disc drive 400 may communicate with host computer 402 using a bus 408.

Memory 406 can include RAM, read only memory ROM, and other sources of resident memory for microprocessor 404. Disc drive 400 includes one or more data storage discs 412. Discs 412 are rotated at a substantially constant high speed by a spindle control circuit 414. One or more heads 416 communicate with the surface(s) of discs 412 to carry out data read/write operations. The radial position of heads 416 is controlled through the application of current to a coil in an actuator assembly 417. A servo control system 420 provides such control.

As noted above, in some embodiments, tracks may be written on one or more storage discs 412 in a partially-overlaying relationship. The overlaying of tracks is shown in close-up view of area 422 of disc(s) 412. In area 422, a corner of head 416A is shown writing a track portion 424. Different shading within the track portion 424 represents different magnetic orientations that correspond to different values of stored binary data. The track portion 424 is overlaid over part of track portion 425. Similarly, track portion 425 is overlaid over part of portion 426, portion 426 is overlaid over portion 427, etc.

The portions 424-427 may be part of what is referred to herein as a physical band which, in this embodiment, may include tens, hundreds or thousands of similarly overlapping, concentric portions 424-427. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 424, 425, 426, 427, for example, are smaller than a width of a write pole (not separately shown) of head 416. However, a width of a reader (not separately shown) of head 416 may be small enough to read individual track portions 424, 425, 426, 427, thereby enabling random reads of data to be carried out.

In certain embodiments, disc drive 400 includes a memory 428 that may serve as, for example, a first/upper level cache denoted by reference numeral 428A. In some embodiments, memory 428 is physically separate from discs 412. The memory 428 may be of a different type than the discs 412. For example, in certain embodiments, memory 428 may be constructed from solid-state components. In one embodiment, memory 428 may be a Flash memory.

In some embodiments, the one or more storage discs 412 are managed as non-overlapping disc portion 430 and disc portion 435. In some embodiments, disc portion 430 is used for a second level cache denoted by reference numeral 430A and disc portion 435 serves as a main store denoted by reference numeral 435A. In an alternate embodiment, each of the first level cache 428A, the second level cache 430A and the main store 435A may be allocated from a pool of memory locations that includes, for example, storage locations from memory 428 and storage locations or physical bands from storage discs 412. Dashed box 427 of FIG. 4A indicates that, in the alternate embodiment, the entire set of storage locations that constitutes the storage space supplied by disc(s) 412 and memory 428 in disc drive 400 may be organized for three uses, namely the first level cache 428A, the second level cache 430A and main store 435A.

In the embodiment of FIG. 4A, disc drive 400 may use memory 428 in conjunction with disc portion 430 in order to manage data as the data is being transferred to main storage locations 435 on disc(s) 412. In the interest of simplification, components such as a read/write channel which encodes data and provides requisite write current signals to heads 416 is not shown in FIG. 4A. Also, any additional buffers that may be employed to assist in data transfer to the memory 428 and the main storage locations 435 are not shown in the interest of simplification.

As noted above, SMR may be used for storage in disc portion 430, which serves as second-level cache 430A. Also, as can be seen in FIG. 4A, main storage locations 435 are on a same data storage medium as the second-level cache locations 430. Thus, in the embodiment of FIG. 4A, second-level cache 430A is a media cache.

A SMR media cache such as 430A may rely on a high cleaning throughput to improve the host write throughput. Accordingly, a large number of extents (e.g., 2 million nodes per 1 TB of capacity) may be enabled, with each extent mapping element utilizing, for example, 32B of DRAM space, which amounts to 64 MB for 2 million extents. This may be a problem for an SMR client with a motivation to drive down cost by, for example, limiting (e.g., reducing) a mapping memory size (e.g., DRAM size).

Accordingly, the embodiment of FIG. 4A employs a map compression module 114 along with an extent mapping module 112 to limit the amount of mapping memory (e.g., DRAM) while simultaneously providing for a large number of extents (e.g., 2 million extents). Extent mapping module 112 and map compression module 114 may be part of microprocessor system 404 or may be separate components coupled to microprocessor system 404. Modules 112 and 114 operate in a manner described above in connection with FIG. 1 and carry out folding and unfolding operations in a manner described in connection with FIGS. 2A, 2B and 2C. Therefore, in the interest of brevity, a detailed description of modules 114 is not repeated in connection with FIG. 4A.

Figure 4B:
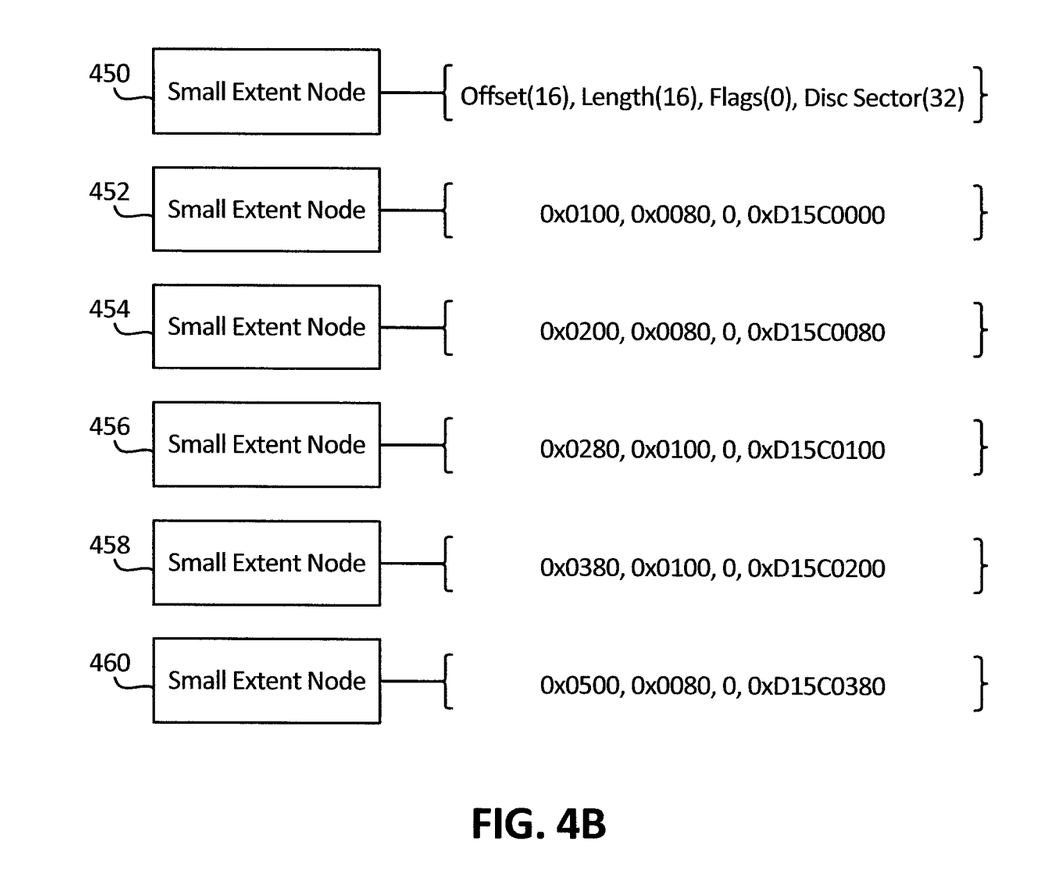
FIG. 4B is a diagrammatic illustration showing fields of a small extent node.

As described earlier in connection with FIGS. 2A, 2B and 2C, a data length of a small extent node may be 8 bytes in one embodiment. FIG. 4B is a diagrammatic illustration showing fields and hexadecimal contents of example small extent nodes 450-460. In the example of FIG. 4B, the offset and length fields are 16 bits wide, the flags field is 0 bits and the physical location (e.g., disc sector) field is 32 bits wide. In such an embodiment, a small extent node may not be beyond a predetermined distance from its carrier node, with the predetermined distance being a function of a length of the offset field of the small extent node. With the 16-bit offset field in the example of FIG. 4B, a small extent node may not be more than 32 MB away from its carrier node. To avoid spreading of small extent nodes, host write data may be stored in first level cache 428 in arrival order and then transferred from first level cache 428A to second level cache 430A in LBA order. In general, any suitable sort operation may be carried out to store extents adjacent to each other before a folding operation into a small extent array with an associated carrier is carried out. When extents are stored in LBA order, next and previous node links may be stripped away such that a next index in the array of small extent nodes in a next small extent node. Also, next and previous physical node links may be stripped away because, when extents are stored in LBA order, an extent identified by a next small extent node in the array is also physically adjacent to a previous extent identified by a previous small extent node.

Figure 5:
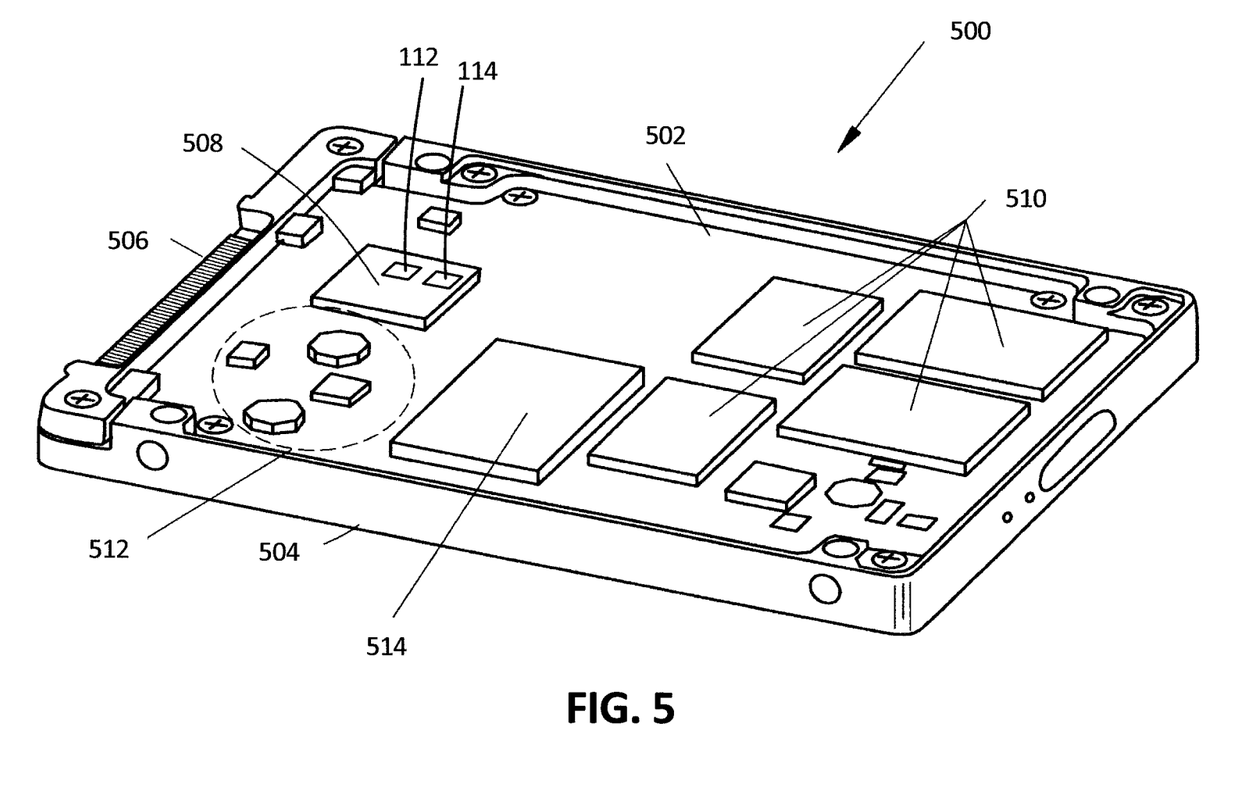
FIG. 5 is an isometric view of a solid-state drive that employs map compression in accordance with one embodiment.

FIG. 5 illustrates an oblique view of a solid state drive (SSD) 500 in which the presently disclosed map compression technique described above in connection with FIGS. 1-2C is useful. SSD 500 includes one or more circuit card assemblies 502 and typically includes a protective, supportive housing 504, a top cover (not shown), and one or more interface connectors 506. SSD 500 further includes a controller ASIC 508, one or more non-volatile memory devices 510, and power regulation circuitry 512. The memory devices 510 are essentially the SSD's data storage media for the caches and main store. In some applications, SSD 500 further includes a power-backup energy storage device, such as a super-capacitor 514.

In accordance with certain aspects, the solid-state drive 500 includes a circuit card assembly 502 that includes a connector 506 for connection to a host computer. In accordance with certain aspects, the connector 506 includes a NVMe (non-volatile memory express), SCSI, SAS, FC-AL (fiber channel arbitrated loop), PCI-E (peripheral component interconnect express), IDE (integrated drive electronics), AT (advanced technology), ATA (advanced technology attachment), SATA, IEEE (institute of electrical and electronics engineers)-1394, USB or other interface connector adapted for connection to a host.

If, as shown in FIG. 5, more than one non-volatile memory device 510 is included in SSD 500, then one of the non-volatile memory devices 510 may be used as the first level cache. Physical storage locations (for example, erasure blocks) in the other one or more non-volatile memory devices 510 may be utilized as second level cache and as main storage locations. In other embodiments, physical storage locations in the one or more non-volatile memory devices 510 may serve a pool of physical bands for assignment to first level cache, second level cache and main storage. In SSD 500, controller ASIC 508 may include extent mapping module 112 and map compression module 114 that operate in a manner described above.

In accordance with various embodiments, the methods described herein may be implemented as one or more software programs running on one or more computer processors or controllers, such as those included in devices 100, 400 and 500. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
generating a map for a storage tier, the map mapping a plurality of extents to physical locations on the storage tier, and the map being implemented as a tree with each extent to physical location mapping being one of a plurality of leaf extent nodes of the tree;
compressing individual ones of the plurality of leaf extent nodes of the tree into small extent nodes, and associating different groups of the small extent nodes with carrier nodes such that each of the carrier nodes has multiple associated small extent nodes;
positioning the carrier nodes and any uncompressed leaf extent nodes in a same hierarchical level of the tree;
receiving a command from a host that involves an extent of the plurality of extents, the extent being represented by a small extent node in one of the carrier nodes;
performing a decompression operation on the small extent node in the one of the carrier nodes to provide a leaf extent node for the extent associated with the host command; and
performing an extent node operation on the leaf extent node for the extent.

2. The method of claim 1 and further comprising, upon completion of the node extent operation, compressing the leaf extent node for the extent associated with the host command into a small extent node and associating the small extent node with the one of the carrier nodes.

3. The method of claim 1 and wherein the carrier nodes and any uncompressed leaf extent nodes are linked in a chain.

4. The method of claim 3 and further comprising delinking, from the chain, the carrier node that provides the leaf extent node for the extent associated with the host command.

5. The method of claim 3 and further comprising linking the leaf extent node for the extent associated with the host command into the chain prior to performing the extent node operation on the leaf extent node.

6. The method of claim 1 and wherein a minimum data structure length of any leaf extent node of the plurality of leaf extent nodes is equivalent to a minimum data structure length of any carrier node of the carrier nodes.

7. The method of claim 1 and wherein a minimum data structure length of any leaf extent node of the plurality of leaf extent nodes is greater than a data structure length of any small extent node of the small extent nodes.

8. A data storage device comprising:
a storage tier; and
control circuitry configured to:
generate a map for the storage tier, the map mapping a plurality of extents to physical locations on the storage tier, and the map being implemented as a tree with each extent to physical location mapping being one of a plurality of leaf extent nodes of the tree;
compress individual ones of the plurality of leaf extent nodes of the tree into small extent nodes, and associate different groups of the small extent nodes with carrier nodes such that each of the carrier nodes has multiple associated small extent nodes;
position the carrier nodes and any uncompressed leaf extent nodes in a same hierarchical level of the tree;

receive a command from a host that involves an extent of the plurality of extents, the extent being represented by a small extent node in one of the carrier nodes;

perform a decompression operation on the small extent node in the one of the carrier nodes to provide a leaf extent node for the extent associated with the host command; and perform an extent node operation on the leaf extent node for the extent.

9. The data storage device of claim 8 and wherein a carrier node of the carrier nodes comprises a logical block address of a first small extent node associated with the carrier node, and wherein the carrier node further comprises a data length value that spans a length of all small extent nodes associated with the carrier node.

10. The data storage device of claim 9 and wherein a data structure of any small extent node associated with the carrier node comprises an offset from the logical block address of the first small extent node associated with the carrier node, a length of the extent represented by the small extent node, flags indicative of a status of the extent represented by the small extent node and a physical location of data associated with a first logical block address of the extent represented by the small extent node.

11. The data storage device of claim 9 and wherein a data structure of a leaf extent node comprises a start logical block address of the extent associated with the leaf extent node, a length of the extent, flags indicative of a status of the extent represented by the leaf extent node and a physical location of data associated with a first logical block address of the extent represented by the leaf extent node.

12. The data storage device of claim 8 and wherein the control circuitry is further configured to, upon completion of the node extent operation, compress the leaf extent node for the extent associated with the host command into a small extent node and associate the small extent node with the one of the carrier nodes.

13. The data storage device of claim 8 and wherein the carrier nodes and any uncompressed leaf extent nodes are linked in a chain.

14. The data storage device of claim 13 and wherein the control circuitry is further configured to delink, from the chain, the carrier node that provides the leaf extent node for the extent associated with the host command.

15. The data storage device of claim 14 and further comprising linking the leaf extent node for the extent associated with the host command into the chain prior to performing the extent node operation on the leaf extent node.

16. The data storage device of claim 8 and wherein a minimum data structure length of any leaf extent node of the plurality of leaf extent nodes is equivalent to a minimum data structure length of any carrier node of the carrier nodes.

17. The data storage device of claim 8 and wherein a minimum data structure length of any leaf extent node of the plurality of leaf extent nodes is greater than a data structure length of any small extent node of the small extent nodes.

18. An apparatus comprising:

an extent mapping module configured to generate a plurality of extent mapping elements, with each extent mapping element mapping one of a plurality of extents to one or more physical locations on a storage tier, and each extent mapping element having a characteristic that enables the extent mapping module to recognize the extent mapping element; and a map compression module configured to:

compress individual ones of the plurality of extent mapping elements into small extent mapping units, with each small extent mapping unit being without the characteristic that enables recognition by the extent mapping module;

associate different groups of the small extent mapping units with carrier elements such that each of the carrier elements has multiple associated small extent mapping units, and each of the carrier elements comprises the characteristic that enables recognition by the extent mapping module; and position the carrier elements and any uncompressed extent mapping elements in a same hierarchical level of a tree structure.

19. The apparatus of claim 18 and wherein the extent mapping element is a leaf node of the tree structure.

20. The apparatus of claim 18 and wherein the characteristic that enables the mapping component to recognize the extent mapping element is a data structure length of the extent mapping element being greater than a predetermined data length.

* * * * *